(12) United States Patent
Cragun et al.

(10) Patent No.: US 9,298,823 B2
(45) Date of Patent: Mar. 29, 2016

(54) IDENTIFYING CORE CONTENT BASED ON CITATIONS

(75) Inventors: Brian J. Cragun, Rochester, MN (US); Michael J. Fork, Gibsonburg, OH (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 12/437,684

(22) Filed: May 8, 2009

(65) Prior Publication Data

US 2010/0287514 A1    Nov. 11, 2010

(51) Int. Cl.
*G06F 3/01* (2006.01)
*G06F 15/16* (2006.01)
*G06F 17/30* (2006.01)

(52) U.S. Cl.
CPC .... *G06F 17/30864* (2013.01); *G06F 17/30882* (2013.01)

(58) Field of Classification Search
CPC .................................. G06F 3/01; G06F 15/16
USPC ........... 715/234–242, 760, 865; 345/155–184
See application file for complete search history.

(56) References Cited

U.S. PATENT DOCUMENTS

| | | | |
|---|---|---|---|
| 2005/0108642 A1* | 5/2005 | Sinclair, II | 715/700 |
| 2006/0277481 A1* | 12/2006 | Forstall et al. | 715/764 |
| 2007/0030245 A1* | 2/2007 | Ngari et al. | 345/156 |
| 2008/0140644 A1* | 6/2008 | Franks et al. | 707/5 |
| 2010/0199195 A1* | 8/2010 | Carounanidy et al. | 715/760 |

* cited by examiner

*Primary Examiner* — Andrea Leggett
(74) *Attorney, Agent, or Firm* — Patterson & Sheridan, LLP

(57) ABSTRACT

Techniques for identifying and conveying core sections of a specified document. Reference documents are identified that each includes a respective citation to a distinct portion of the specified document. The core sections are determined based on the citations of the reference documents. The core sections are output in a manner that emphasizes the core sections over non-core sections of the specified document.

24 Claims, 5 Drawing Sheets

IDENTIFYING CORE CONTENT BASED ON CITATIONS

BACKGROUND OF THE INVENTION

1. Field of the Invention

The field of the invention relates to conveying web content. More specifically, the field of the invention relates to identifying and conveying core content on web pages.

2. Description of the Related Art

Web pages on the Internet are rich with content. Often, however, only a portion of the content is useful to a reader. Sighted users may glance over a web page and quickly identify sections to read and sections to ignore. Sight impaired users, however, may lack the ability to visually skim a web page to determine useful content. Sight impaired users often rely on screen readers, which are programs that read web content and output the content to the user via some appropriate output device such as a speaker. However, screen readers may only output content sequentially. Thus, a sight impaired user using a screen reader may not easily skim a web page to determine useful content. Further, screen magnifiers may only focus on only one area of a screen at a time. Thus, a sight impaired user using a screen magnifier may not easily skim a web page to determine useful content.

SUMMARY OF THE INVENTION

One embodiment of the invention includes a method for conveying a core section of a requested web page to a user, the core section being determined by citations by other web pages to the requested web page, the method comprising configuring one or more processors to perform an operation. The operation may generally include receiving a request from a user for a web page, the request having been input via an input device; identifying a citing web page related to the requested web page, wherein the citing web page is identified by language of the citing web page that is cited from the requested web page; dividing content of the requested web page into a plurality of sections; identifying a section of the requested web page as a core section, wherein the core section is identified by language cited by the citing web page; and in response to the request, conveying via an output device the core section of the requested web page to the user in a manner that distinguishes the core section from any remaining sections of the requested web page.

Another embodiment of the invention includes a computer-readable storage medium containing a program, which when executed by the processor is configured to perform an operation for conveying a core section of a requested web page to a user, the core section being determined by citations by other web pages to the requested web page. The operation may generally include receiving a request from a user for a web page, the request having been input via an input device; identifying a citing web page related to the requested web page, wherein the citing web page is identified by language of the citing web page that is cited from the requested web page; dividing content of the requested web page into a plurality of sections; identifying a section of the requested web page as a core section, wherein the core section is identified by language cited by the citing web page; and in response to the request, conveying via an output device the core section of the requested web page to the user in a manner that distinguishes the core section from any remaining sections of the requested web page.

Still another embodiment of the invention includes a system having a processor and a memory containing a program, which when executed by the processor is configured to perform an operation for conveying a core section of a requested web page to a user, the core section being determined by citations by other web pages to the requested web page. The operation may generally include receiving a request from a user for a web page, the request having been input via an input device; identifying a citing web page related to the requested web page, wherein the citing web page is identified by language of the citing web page that is cited from the requested web page; dividing content of the requested web page into a plurality of sections; identifying a section of the requested web page as a core section, wherein the core section is identified by language cited by the citing web page; and in response to the request, conveying via an output device the core section of the requested web page to the user in a manner that distinguishes the core section from any remaining sections of the requested web page.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
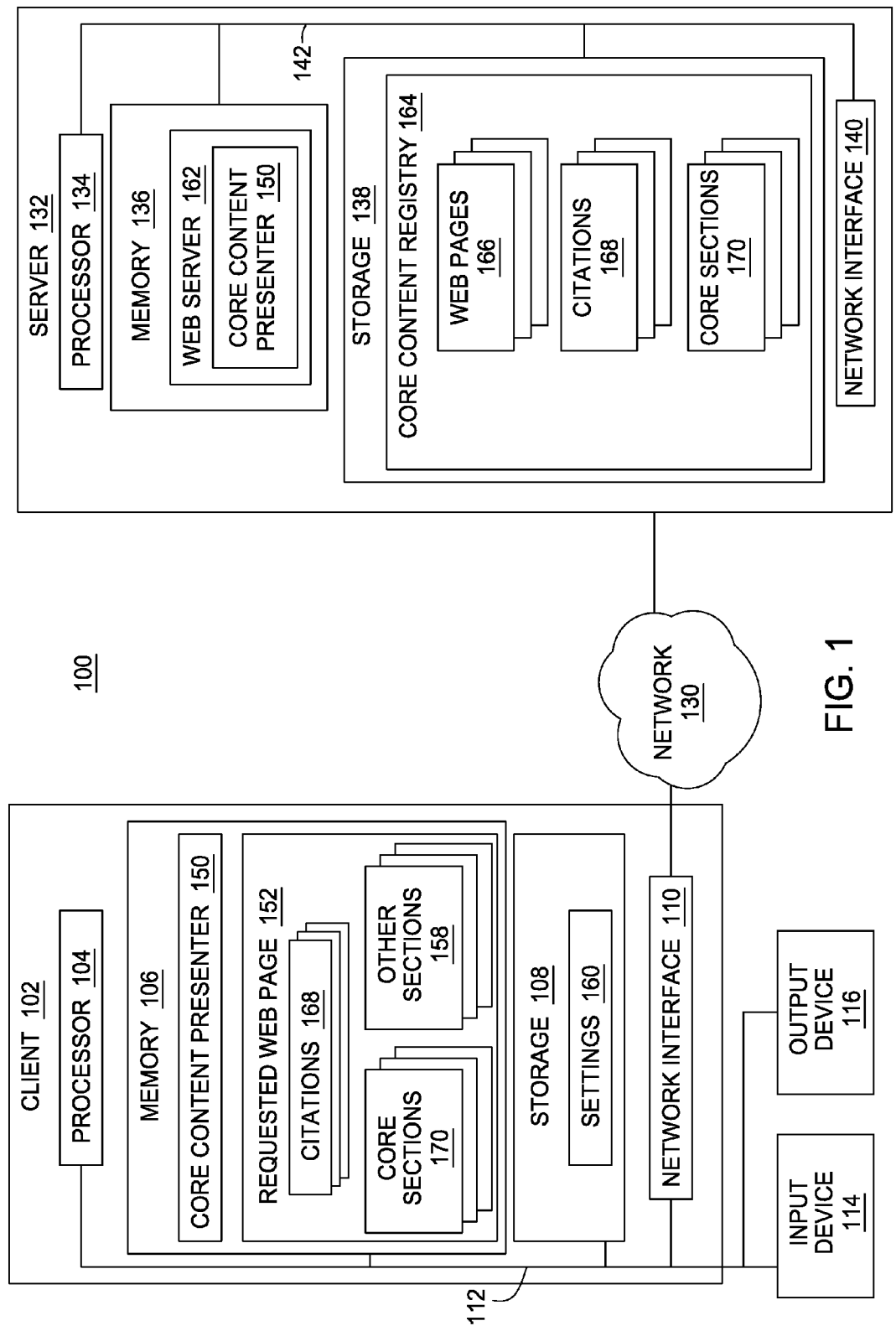
FIG. 1 is a block diagram illustrating a system for conveying core content on web pages, according to one embodiment of the invention.

Embodiments of the present invention generally provide for conveying a core section of a web page to a user. One embodiment of the invention provides a core content presenter. The core content presenter may identify core sections based on citations by other web pages. Further, the core content presenter may convey the core section to the user in a distinctive manner relative to other sections of the web page. If the web page includes a plurality of core sections, the core content presenter may cycle through the plurality of core sections based on user input. Further, the core content presenter may convey information about a citing web page. The core content presenter may also customize core sections by receiving user input to modify predefined criteria for identifying citations and core sections.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for conveying core content on web pages, according to one embodiment of the invention. The networked system 100 includes a client 102 and a server 132. The client 102 and the server 132 are connected via a network 130. In general, the network 130 may be a telecommunications network and/or a wide area network (WAN). In a particular embodiment, the network 130 is the Internet.

The client 102 generally includes a processor 104 connected via a bus 112 to a memory 106, a network interface device 110, a storage 108, an input device 114, and an output device 116. The client 102 is generally under the control of an operating system (not shown). Examples of operating systems include UNIX, versions of the MICROSOFT WINDOWS® operating system, and distributions of the LINUX® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

The network interface device 110 may be any entry/exit device configured to allow network communications between the client 102 and the server 132 via the network 130. For example, the network interface device 110 may be a network adapter or other network interface card (NIC).

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the client 102. For example, a keyboard, keypad, light pen, touch-screen, track-ball, or speech recognition unit, audio/video player, and the like may be used.

The output device 116 may be any device for providing output to a user of the client 102. For example, the output device 116 may be any conventional display screen or set of speakers, along with their respective interface cards, i.e., video cards and sound cards (not shown). The output device 116 may also include, or be used in conjunction with, text-to-speech functionality such as a screen reader application. Further, the output device 116 may be a tactile-detectable device, such as a Braille device. Although shown separately from the input device 114, the output device 116 and input device 114 may be combined. For example, a display screen with an integrated touch-screen, a display with an integrated keyboard, or a speech recognition unit combined with a text speech converter may be used.

The server 132 generally includes a processor 134 connected via a bus 142 to a memory 136, a network interface device 140, and a storage 138. The processor 134 may be any hardware processor used to perform an embodiment of the invention.

Like the memory 106, the memory 136 may be a random access memory sufficiently large to hold the necessary programming and data structures of the invention. The programming and data structures may be accessed and executed by the processor 134 as needed during operation. While the memory 136 is shown as a single entity, it should be understood that the memory 136 may in fact comprise a plurality of modules, and that the memory 136 may exist at multiple levels, from high speed registers and caches to lower speed but larger DRAM chips.

Like the network interface device 110, the network interface device 140 may be any entry/exit device configured to allow network communications between the client 102 and the server 132 via the network 130. For example, the network interface device 140 may be a network adapter or other network interface card (NIC).

Like the storage 108, the storage 138 may be a storage device. Although the storage 138 is shown as a single unit, the storage 138 may be a combination of fixed and/or removable storage devices, such as fixed disc drives, floppy disc drives, tape drives, removable memory cards, or optical storage. The memory 136 and the storage 138 may be part of one virtual address space spanning multiple primary and secondary storage devices.

As shown, the memory 106 of the client 102 includes a core content presenter 150 and a requested web page 152. The requested web page 152 may be a static web page, a dynamically generated web page, etc. Further, the requested web page 152 includes citations 168, core sections 170, and other sections 158. The storage 108 of the client 102 includes settings 160. FIGS. 2 through 5 and associated descriptions detail the structure and operation of the core content presenter 150 running on the client 102.

As shown, the memory 136 of the server 132 includes a web server 162. Further, the web server 162 includes the core content presenter 150. In addition, the storage 138 of the server 132 includes a core content registry 164. Further, the core content registry includes web pages 166, citations 168, and core sections 170. The web pages 166 may be static web pages, dynamically generated web pages, etc. FIGS. 2 through 5 and associated descriptions detail the structure and operation of the core content presenter 150 running on the server 132. Those skilled in the art will recognize that embodiments of the invention may be adapted to support a standalone core content presenter (i.e., a core content presenter 150 that is not integrated within a web server 162). Further, a core content presenter 150 that resides only on the client 102 may be supported by embodiments of the invention. Further still, those skilled in the art will recognize that embodiments of the invention may be adapted to support a core content registry 164 residing on a separate server than the server 132 on which the web server 162 executes.

Although embodiments are described herein with reference to a client-server network model, network models other than client-server, such as peer-to-peer, are broadly contemplated.

Figure 2:
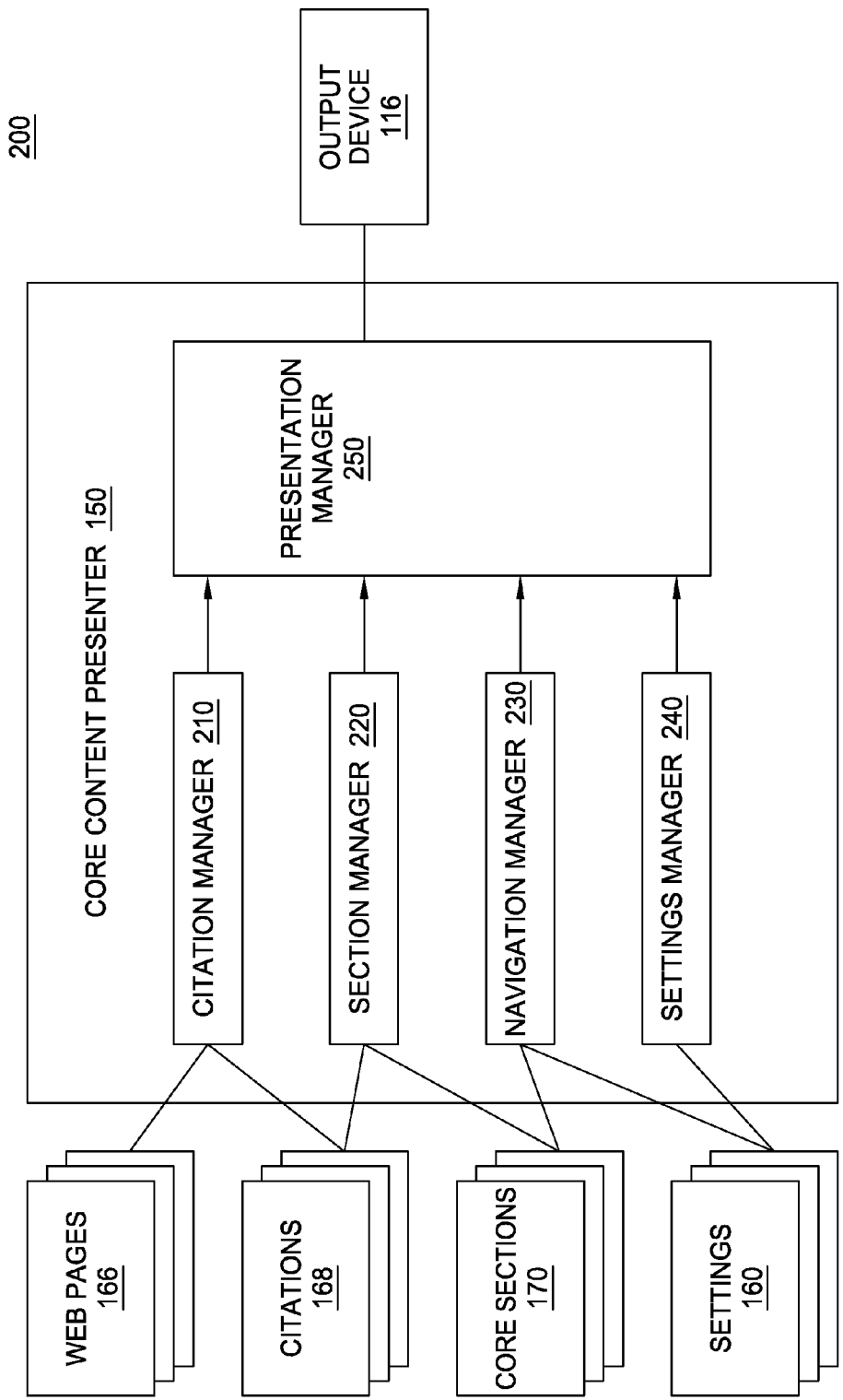
FIG. 2 is a block diagram illustrating a functional view of a core content presenter, according to one embodiment of the invention.

FIG. 2 is a block diagram illustrating a functional view 200 of the core content presenter 150 of FIG. 1, according to one embodiment of the invention. As shown, the core content presenter 150 includes a citation manager 210, a section manager 220, a navigation manager 230, a settings manager 240, and a presentation manager 250.

In one embodiment, the core content presenter 150 receives a requested web page 152 and identifies core sections 170 of the requested web page 152. A web page 152 includes one or more sections. A section refers to any plurality of words such as a paragraph, sentence, clause, fragment, and the like. The plurality of words may also be specified by any tags of a markup language (such as HTML <p>, <table>, <tr>, <td>, <span>, and <div> tags, etc.). A core section 170 of a requested web page 152 refers to a section of the requested web page 152 cited to by another web page 166. Table I shows an illustrative requested web page 152:

TABLE I

Requested web page example

| Title: | The U.S. Constitution |
| URI: | "http://whitehouse.gov/const.html" |
| Content: | When in the Course of human events, it becomes necessary for one people to dissolve the political bands which have connected them with another, and to assume among the |

TABLE I-continued

Requested web page example powers of the earth, the separate and equal station to which the Laws of Nature and of Nature's God entitle them, a decent respect to the opinions of mankind requires that they should declare the causes which impel them to the separation.
<u>We hold these truths to be self-evident,</u>
<u>that all men are created equal,</u> that
they are endowed by their Creator with certain unalienable Rights, that among these are Life, Liberty and the pursuit of Happiness . . .

In this specific example, a user requests a web page at a Uniform Resource Identifier (URI): "http://whitehouse.gov/const.html". The title of requested web page 152 is "The U.S. Constitution." As shown, the core content presenter 150 identifies a phrase as a core section 170 in the requested web page 152. Shown in underscore in Table I, the core section 170 is "We hold these truths to be self-evident, that all men are created equal." In one embodiment, the core content presenter 150 conveys the core section 170 to a user in a distinct manner than other sections 158. The other sections 158 refer to words in the requested web page 152 that were not identified as a core section 170.

The web pages 166 that cite to the requested web page 152 may be any collection of web pages. For example, the web pages 166 may be all web pages: (i) on a server 132, (ii) in a directory on the server 132, (iii) of a website, (iv) on all servers of a domain name, (v) accessible from a predefined plurality of domain names, (vi) discovered by a web spider application, or (vii) accessible via a network 130 (e.g., an intranet, the Internet, etc.). Further, the web pages 166 may also be any web pages accessible via a network 130 and that meet one or more predefined conditions (such as conditions involving page size, <meta> tag values, etc.). Further still, the web pages 166 may be any predefined list of web pages on a network 130 (e.g., a list of URIs).

In one embodiment, the core content presenter 150 outputs the core sections 170 in a distinct manner relative to the other sections 158. For example, the core sections 170 may be output first (i.e., before outputting the other sections 158) to an output device 116. For instance, the output device 116 may be a screen reader used in conjunction with a Braille device, audio output device, etc. Thus, for the exemplary webpage given above, the core content presenter 150 may output "We hold these truths to be self-evident, that all men are created equal" (to the Braille device or to the audio output device) before outputting any other content of the requested web page 152.

The output device 116 may also be a screen magnifier used in conjunction with a graphical display device. In this case, the core content presenter 150 may position the screen magnifier on one of the core sections 170 (e.g., the first core section, the core section having the most citations, etc.). Further, the core content presenter 150 may cycle the screen magnifier through the core sections 170 based on user input via the input device 114, according to one embodiment.

Further, the output device 116 may simply be a graphical display device for sighted users. In this case, the core content presenter 150 may display core sections 170 in a visually distinct manner relative to the other sections 158. For example, the core content presenter 150 may display core sections in larger font, in all capital letters, in italics, in bold, in underscore, as a hyperlink, with a border surrounding the core section, etc. Other ways of displaying the core sections 170 in a visually distinct manner relative to the other sections 158 are broadly contemplated. For example, the core content presenter 150 may display a copy of the core sections on top of the requested web page 152 (i.e., before any section of the requested web page 152).

As noted above, in one embodiment, the core content presenter 150 identifies core sections 170 of the requested web page 152 based on other web pages 166 that contain citations to the requested web page 152. A citation refers to a reference made from one web page (the citing page) to another web page (the cited page). The reference may be explicit such as by the provision of hyperlinks or URIs in the citing page to the cited page. Alternatively, the reference may be implicit such as by the provision of common language in the content of on both pages, or footnote citations or endnote citations (to a cited page) in a citing page. It should be noted that the terms "cited page" and "citing page" are merely terms of convenience, and not limiting. In general, the requested webpage may be referred to as the cited page, which in turn is referenced by a citing page(s); but the citing page in this case may itself be requested (by the requested webpage or by yet a third web page) and, therefore, also be a cited page in that context.

Table II shows an illustrative web page 166 that contains a citation from the requested web page example of Table I:

TABLE II

Web page citation example

| | |
|---|---|
| Title: | A Thomas Jefferson Tribute |
| URI: | "http://fcc.gov/jefferson.html" |
| Content: | In 1776, Thomas Jefferson wrote, "We hold these truths to be self-evident, that all men are created equal." These famous words expressed . . . |

As shown, the title of the web page 166 is "A Thomas Jefferson Tribute." Further, the web page 166 is located at URI "http://fcc.gov/jefferson.html". The web page 166 contains the following language from the requested web page 152 of Table I: "We hold these truths to be self-evident, that all men are created equal." In one embodiment, the core content presenter 150 identifies the language as a citation to the requested web page 152 of Table I (i.e., the web page located at "http://whitehouse.gov/const.html"). For example, the core content presenter 150 may perform a text comparison between the cited language and the requested web page 152 of Table I. In this case, the citation is implicit in that the relationship between the requested webpage 152 and the citing webpage 166 is established merely by the provision of common content.

In one embodiment, the core content presenter 150 preprocesses one or more of the web pages 166 prior to receiving a request for a web page 152. For example, preprocessing web pages 166 may include performing text comparisons of the web pages 166 to identify cited language in the web pages 166.

The core content presenter 150 may also process one or more of the web pages 166 after receiving a request for a web page 152, according to one embodiment. For example, the core content presenter 150 may identify cited language on the fly. Further, the core content presenter may specify a timeout period. After the specified timeout period has elapsed, the core content presenter 150 may present core sections 170 based on cited language thus far identified.

In one embodiment, the citation manager 210 receives web pages 166 and identifies cited language and other information in the web pages 166. That is, the web pages 166 may contain cited language (i.e., language found in one or more other web pages); the web pages 166 may also contain a hyperlink to a cited web page. The citation manager 210 identifies cited language on each web page 166. Further, the citation manager 210 may identify other information about each web page 166. Examples of other information include a title, a Uniform Resource Indicator (URI), etc. Further, the title may be of a web page, a blog entry, a notebook created using a research tool (e.g., the GOOGLE NOTEBOOK™ tool), a technical paper, etc. Suppose a requested web page 152 includes the following sections, as shown in Table III:

TABLE III

Sections example for a requested web page
Requested web page R

| |
|---|
| Section 1 |
| Section 2 |
| Section 3 |
| Section 4 |
| Section 5 |
| Section 6 |

As shown, the requested web page 152 includes six sections, respectively numbered 1 through 6. Suppose further that web pages 166 cite to the requested web page 152. In one embodiment, the citation manager 210 processes the web pages 166 and identifies citations 168 to other web pages. The identified citations 168 may include citations to the requested web page 152. Table IV shows exemplary citations to the requested web page 152 identified in the web pages 166 by the citation manager 210:

TABLE IV

Citations example to a requested web page

| |
|---|
| Web page A - cites Sections 3 and 5 of requested web page R |
| Web page B - cites Section 3 of requested web page R |

In this specific example, the web pages 166 include a web page A that cites Sections 3 and 5 of the requested web page 152. The web pages 166 also include a web page B that cites Section 3 of the requested web page 152. For the purposes of this example, citations to web pages other than the requested web page 152 (i.e., to web pages other than web page R) are not shown. In one embodiment, the citations 168 may be stored in persistent storage. For example, the citations 168 may be stored in a database system, as a flat file, etc.

In one embodiment, the section manager 220 identifies one or more core sections 170 of the requested web page 152 based on the citations 168. Table V shows illustrative core sections 170 identified by the section manager 220 based on the citations example of Table IV:

TABLE V

Core sections example for a requested web page
Requested web page R

| |
|---|
| Section 1 |
| Section 2 |
| Section 3 - Two citations: web page A, web page B |
| Section 4 |
| Section 5 - One citation: web page A |
| Section 6 |

As shown, section manager 220 identifies Section 3 and Section 5 as core sections 170 of the requested web page 152 (as indicated by underscore). Other sections 158 of the requested web page 152 include Sections 1, 2, 4, and 6. In one embodiment, the section manager 220 may also include information about the web pages 166 that cite the requested web page 152 (i.e., the citing web pages). For example, information about a citing web page 166 may include a reference (e.g., a URI) that allows a user to access the citing web page 166. Further, information about a citing web page 166 may also include a document title, metadata, and cited language in the citing web page 166. Like the citations 168, the core sections 170 may also be stored in persistent storage (e.g., in a database system, as a flat file, etc.).

In one embodiment, the presentation manager 250 outputs a requested web page 152 to the output device 128 based on settings 160. Referring to the core sections example of Table V, the presentation manager 250 may output Section 3, followed by Section 5, followed by other sections of the requested web page 152. That is, the presentation manager 250 outputs core sections 170 before other sections 158 of a requested web page 152.

Further, a user may prefer that the core sections 170 be repeated when the other sections 158 are output. Accordingly, in one embodiment, the presentation manager 250 may output core sections 170 before outputting all sections (core and otherwise) of a requested web page 152. Referring to the core sections example of Table V, the presentation manager 250 may output Sections 3 and 5, followed by Sections 1 through 6 (thereby repeating Sections 3 and 5).

In another embodiment, the presentation manager 250 may output only the core sections 170 of a requested web page 152. In such a case, the presentation manager 250 awaits user input before outputting the other sections 158 of the requested web page 152. Referring once again to the core sections example of Table V, the presentation manager 250 may only output Sections 3 and 5, awaiting user input before outputting any other section of the requested web page 152.

Further, the presentation manager 250 may output core sections 170 in a distinct manner than other sections 158 of a requested web page 152. For example, if the output device 116 is an audio output device used in conjunction with text-to-speech functionality (e.g., a screen reader), the presentation manager 250 may read core sections 170 in a different voice than other sections 158 of a requested web page 152. Examples of a different voice include a louder voice, a higher-pitched voice, a voice that speaks more slowly, a voice that speaks in a heavier accent, etc.

If the output device 116 is a graphical display device used in conjunction with a screen magnifier, the presentation manager 250 may place the screen magnifier on a core section 170 (e.g., on the core section 170 with the most citations). Similarly, if the output device 116 is graphical display device with a limited resolution (such as displays on cellular phones or personal digital assistants, etc.), the presentation manager 250 may place the viewing window of the graphical display device on a core section 170.

In the above examples of core sections, a user may cycle through the core sections 170 using a cycling mechanism such as a predefined keystroke (e.g., TAB key), according to one embodiment. The cycling mechanism is further discussed below in conjunction with a settings example of Table VII and its accompanying description.

Further, the presentation manager 250 may output cited language in a distinct manner relative to a core section 170 containing the cited language. For example, if the output device 116 is an audio output device used in conjunction with a text-to-speech functionality (e.g., a screen reader), the presentation manager 250 may read cited language in a different voice than the containing core section 170. Further, a user may also cycle through cited language in a core section 170 by using a predefined keystroke. In one embodiment, a user may toggle between cycling through core sections and cycling through cited language in a core section using yet another predefined keystroke (e.g., ALT key).

Moreover, the presentation manager 250 may output core sections 170 in a distinct manner than the other sections 158 for sighted users. For example, the distinct manner may include larger font, a different font color, a different background color, underscore, bold, italics, highlighting, borders or whitespace around a core section, etc. The distinct manner may involve formatting the core sections 170, the other sections 158, or both the core sections 170 and the other sections 158. For example, the presentation manager 250 may "gray out" other sections 158 (i.e., modify the font of the other sections 158 to be gray font). Further, the presentation manager 250 may hide other sections 158 from display and provide a link or button for showing the hidden sections.

In one embodiment, within a core section, the presentation manager 250 may output cited language in a distinct manner than other language in the core section 170. For example, cited language in a core section 170 may be highlighted (i.e., such as giving the impression of a highlighter marker). Alternatively, other language in the core section 170 may be grayed out.

Other ways of outputting core sections 170 and cited language in a distinct manner are broadly contemplated. For example, the presentation manager 250 may output a copy of each core section 170 at the top of a requested web page 152.

In one embodiment, the core content presenter 150 outputs core sections 170 in a distinct manner by modifying the requested web page 152 (or a copy of the requested web page 152) and outputting the modified web page to a user. For example, a core content presenter 150 (e.g., as part of a web server 162 on a server 132) may serve a marked up copy of the requested web page 152 to the client 102. A marked up copy refers to a web page modified to include core content information. Core content information identifies core sections 170 and provides citations 168, etc. Further, the core content presenter 150 may retrieve core content information from the core content registry 164, according to one embodiment.

For example, the core content presenter 150 may modify a requested web page 152 to include HTML <meta> tags containing the core content information. As another example, the core content presenter 150 may also predefine a set of custom Cascading Style Sheets (CSS) classes. In this specific example, the core content presenter 150 "marks up" the requested web page 152 using the predefined set of custom CSS classes. Table VI shows an exemplary marked up web page using custom CSS classes:

TABLE VI

Core content markup example (CSS)

```
<head><title>The U.S. Constitution</title>
<meta name="cited-by" content="title: A Thomas Jefferson
Tribute; URI: http://fcc.gov/jefferson.html; cites: We hold
these truths to be self-evident, that all men are created
equal" />
<style type="text/css">
.core-section {font-style: italic;}
.cited-language {color: blue;}
</style></head>
<body>
    <p>When in the Course of human events, it becomes
    necessary for one people to dissolve the political bands which
    have connected them with another, and to assume among the
    powers of the earth, the separate and equal station to which
    the Laws of Nature and of Nature's God entitle them, a decent
```

TABLE VI-continued

Core content markup example (CSS)

respect to the opinions of mankind requires that they should declare the causes which impel them to the separation.</p>
    <span class="core-section"><p><span class="cited-language">We hold these truths to be self-evident, that all men are created equal</span>, that they are endowed by their Creator with certain unalienable Rights, that among these are Life, Liberty and the pursuit of Happiness . . . .</p></span>
. . . .
</body>

As shown, the core content markup example of Table VI corresponds to the requested web page example of Table I. In this specific example, the core content presenter 150 defines two CSS classes: core-section and cited-language, representing core sections and cited language, respectively. Further, the core content presenter 150 specifies that core sections are displayed in italic font, while cited language is displayed in blue-colored font. In addition, the core content presenter marks up the cited language, "We hold these truths to be self-evident, that all men are created equal," using a <span class="core-section"> tag. Moreover, the core content presenter 150 marks up a paragraph containing the cited language using another <span class="cited-language"> tag, thereby specifying the paragraph as a core section.

Further, the core content markup example of Table VI includes a citation 168. The citation 168 includes information about the title and URI of a citing web page and the cited language. In this specific example, the core content presenter 150 modifies the requested web page 152 to include a <meta> tag that specifies citations 168. As shown, the title of a citing web page is "A Thomas Jefferson Tribute." Further, a URI "http://fcc.gov/jefferson.html" identifies the citing web page. In addition, the cited language is "We hold these truths to be self-evident, that all men are created equal." Taken together, a core content presenter 150 that runs on the client 102 may output the citations 168 based on user input. The core content presenter 150 may also output the citing web page itself (e.g., the web page titled "A Thomas Jefferson Tribute"), in response to a user request for the citing web page. Although shown in FIG. 1 as a standalone application, other embodiments of the core content presenter 150 are broadly contemplated. For example, the core content presenter 150 may be part (e.g., a plug-in, etc.) of a web browser application running on the client 102.

Although embodiments are described herein with reference to core content markup in both the document head (i.e., the <head> part) and the document body (i.e., the <body> part) of a requested web page 152, other ways to mark up a requested web page 152 are broadly contemplated. For example, the core content presenter 150 may mark up a requested web page 152 by modifying solely the document head (or solely the document body) of a requested web page 152. Further, other ways of modifying a requested web page 152 (such as using a predefined set of custom HTML tags) are broadly contemplated.

Further, the navigation manager 230 may provide access to the citations 168 associated with the core sections 170, according to one embodiment. For example, a user may cycle to a core section 170 and input a predefined keystroke (e.g., SPACE key) to access citations 168 associated with the core section 170. Referring to the core sections example of Table V, a user may cycle to Section 5 and hit the SPACE key to access citations 168 associated with section 5. For example, the citations 168 may include information about web page A (i.e., the web page citing Section 5, according to Table V), such as title, URI, metadata, cited language, etc. The citations 168 associated with section 5 may also include summary information (e.g., total number of citations for the core section, etc.), as shown in Table V.

In one embodiment, the navigation manager 230 may also generate a list of core sections 170. The list may include the first sentence of each core section 170. Further, the list may include a total number of citations for each core section. If the output device 116 is a graphical display device, the presentation manager may present the list as a navigation pane, as a pop-up window, etc. If the output device 116 is an audio output device used in conjunction with a screen reader application, the presentation manager may output the list sequentially (i.e., to be read aloud to a user). Further, the presentation manager may output a core section based on user input in response to the list of core sections 170. Other lists based on core sections 170 are broadly contemplated and may be supported by embodiments of the invention.

In one embodiment, the settings manager 240 receives user input via the input device 114 and configures the settings 160. The settings 160, in turn, determine the manner in which the requested web page 152, the core sections 170, the citations 168, and the web pages 166 are output by the navigation manager 230 and by the presentation manager 250. Table VII shows an illustrative settings 160:

TABLE VII

Settings example

| | |
|---|---|
| Cited language minimum size: | 6 words |
| Cited language maximum size: | None |
| Criteria for a core section: | Cited by 1 or more web pages |
| Order in which to output core sections: | Top-down |
| Number of core sections to output: | No limit |
| Section minimum size: | 1 sentence |
| Section maximum size: | 1 paragraph |
| Keystroke for cycling: | TAB key |
| Keystroke for back-cycling: | SHIFT + TAB keys |

In this specific example, the settings 160 specify that the minimum size for cited language is six words. That is, cited language of five words or fewer may be ignored for the purposes of identifying cited language and core sections 170. Further, there is no maximum size for cited language. In addition, the criteria for a core section specify that a section should be cited by one or more web pages (i.e., to be identified as a core section). That is, the criteria may specify a threshold number of citations a core section should include, according to one embodiment. Further examples of criteria for a core section include "Cited 15 times" (i.e., multiple citations from a single web page do count) and "Cited by 5 or more different websites (i.e., multiple citations from different web pages belonging to the same web site do not count).

In one embodiment, the core content presenter 150 may identify a core section 170 using a technique of expansion, i.e., "expanding on" cited language to include words surrounding the cited language. For example, the core content presenter 150 may identify an entire paragraph containing a cited sentence as a core section 170. As a further example, a core section 170 may be a cited sentence expanded to include anything in the same table cell or <div> HTML tag, etc. Expansions may be configured via settings 160. In another embodiment, a core section 170 may include expanded content only if the expanded content contains a sufficient percentage of related words (i.e., to cited language). In this case, a user may customize a threshold percentage of related words via the settings manager 240. In another embodiment, a section 158 of the requested web page 152 may be identified as a core section simply because the section 158 contains a sufficient percentage of related words to cited language in the requested web page 158 (i.e., the section 158 itself need not include any cited language).

Furthermore, the settings 160 specify that the core sections 170 should be output in top-down fashion (i.e., according to an order in which the core sections 170 appear on the requested web page 152). Alternatively, the core sections 170 may be output by number of citations instead of in top-down fashion (e.g., core sections 170 with more citations are output first or more distinctly than core sections 170 with fewer citations). The settings 160 further specify that there is no limit to the number of core sections to output for a requested web page 152. In addition, the minimum size for a section is one sentence, while the maximum size for a section is one paragraph. Taken together, an illustrative core section 170 of a requested web page 152 is shown in Table VIII:

TABLE VIII

Core section example one
(Section maximum size: 1 paragraph)

This entire paragraph is a core section according to the settings example of Table VII. The first six words of this sentence are cited by web page A. Further, web pages B and C both cite this entire sentence. Here is a sentence not cited by any web page. Once again, this entire paragraph is a core section according to Table VII.

In Table VIII, cited language is shown in underscore and a core section is shown in italics. In this specific example, the core content presenter 150 may output the entire paragraph in Table VIII as a core section. To further illustrate how the settings 160 determine output of the core content presenter 150, suppose that a user modified the maximum size for a core section (e.g., as specified in Table VII) to be one sentence (i.e., instead of one paragraph). In this case, core sections 170 of a requested web page 152 may be as shown in Table IX:

TABLE IX

Core section example two
(Section maximum size: 1 sentence)

This entire paragraph, adapted heavily from core section example one of Table VIII, is no longer itself a core section, although this paragraph now includes two core sections. The first six words of this sentence are cited by web page A; this sentence is now a first core section. Further, web pages B and C both cite this entire sentence; this sentence is now a second core section. Here is a sentence not cited by any web page. Once again, this entire paragraph is no longer a core section.

In Table IX, cited language is shown in underscore and core sections are shown in italics. In this specific example, the core content presenter 150 may output the second core section (which has two citations) followed by the first core section (which only has one citation).

Further, the settings manager 240 may configure additional settings specific to an output device type, based on user input. Table X shows illustrative settings for an audio output device:

TABLE X

Additional settings example for an audio output device

| | |
|---|---|
| Read cited language in a different voice | Yes |
| Read other sections automatically after reading core sections | Yes |
| Repeat core sections when reading other sections | Yes |

In this particular example, the settings 160 additionally specify that cited language should be read in a different voice. Further, the settings 160 specify that other sections 158 should be read automatically after reading core sections 170 (i.e., as opposed to pausing and awaiting user input). The settings 160 also specify that core sections 170 should be repeated when reading other sections 158. Other ways of customizing the output of the core content presenter 150 for specific output devices 116 are broadly contemplated. For example, an additional setting for a graphical display device may specify whether a copy of the core sections 170 should be output at the top of the requested web page 152.

Figure 3:
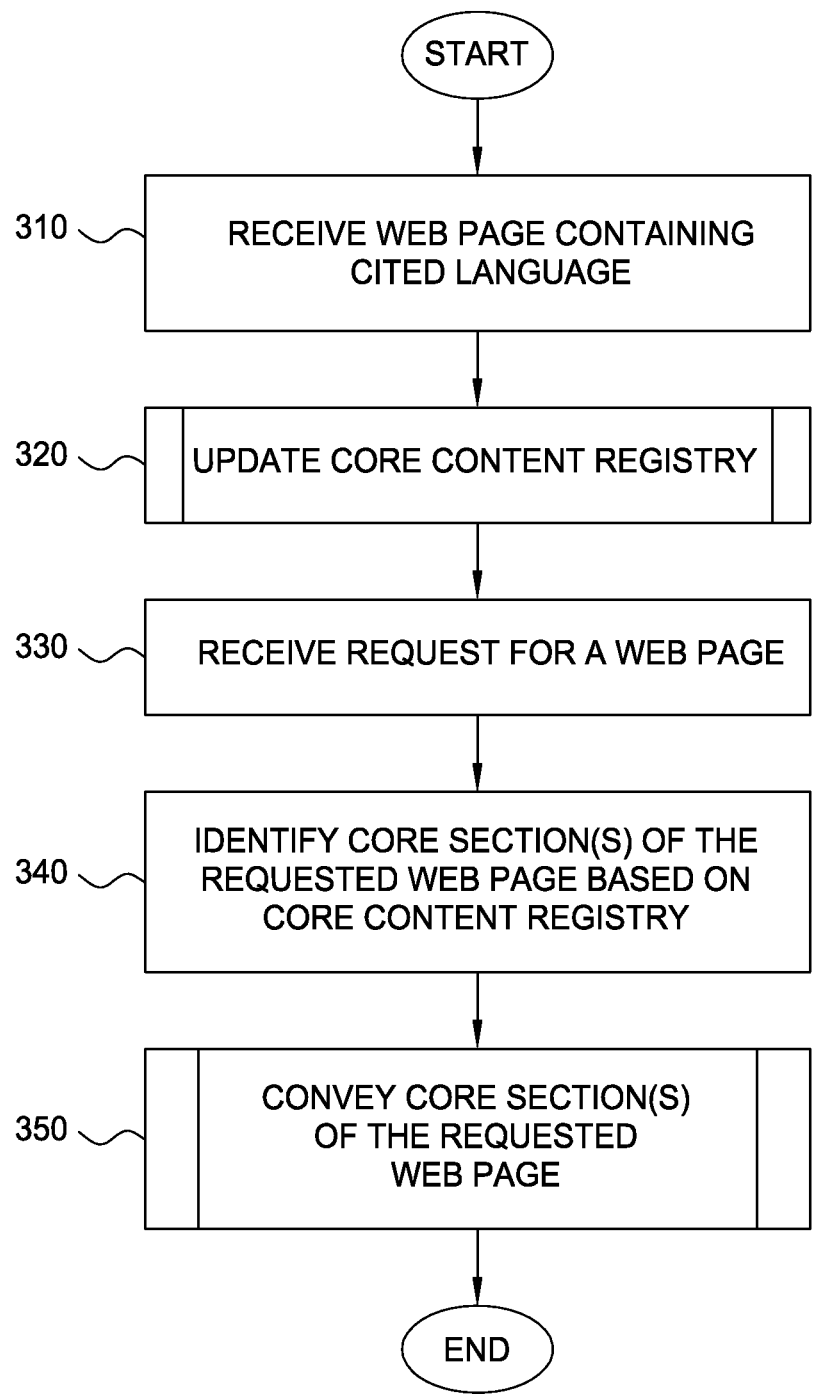
FIG. 3 is a flowchart depicting a method for identifying and conveying core sections of a web page, according to one embodiment of the invention.

FIG. 3 is a flowchart depicting a method 300 for identifying and conveying core sections 170 of a requested web page 152, according to one embodiment of the invention. The method 300 may be performed by the core content presenter 150 of FIG. 1. The steps of the method 300 are described in conjunction with the web page example of Table II, the core sections example of Table V, the core content example of Table VI, and the additional settings example of Table X.

As shown, the method 300 begins at step 310, where the citation manager 210 receives a web page 166 containing cited language. For example, the citation manager 210 may receive the web page of Table II. At step 320, the citation manager 210 and the section manager 220 may update the core content registry 164. For example, the citation manager 210 may update the citations 168 in the core content registry 164 with the citation of Table II. In addition, the section manager 220 may update the core sections 170 in the core content registry 164 by specifying as a core section the paragraph containing the citation of Table II. Step 320 is further discussed below in conjunction with FIG. 4 and its accompanying description.

At step 330, the citation manager 210 may receive a user request for a web page 152. For example, a user may request the web page of Table I by typing a URI "http://whitehouse.gov/const.html" in a web browser application. At step 340, the presentation manager 250 identifies core sections 170 of the requested web page 152 based on the core content registry 164. For example, the presentation manager 250 may identify the core sections of Table V.

At step 350, the presentation manager 250 conveys the core sections 170 of the requested web page 152 to the user. For example, the presentation manager 250 may generate the marked up web page of Table VI. Further, the presentation manager may read the core sections 170 of the marked up web page to a user via an audio output device based on the additional settings of Table X. Step 350 is further discussed below in conjunction with FIG. 5 and its accompanying description. After step 350, the method 300 terminates.

Figure 4:
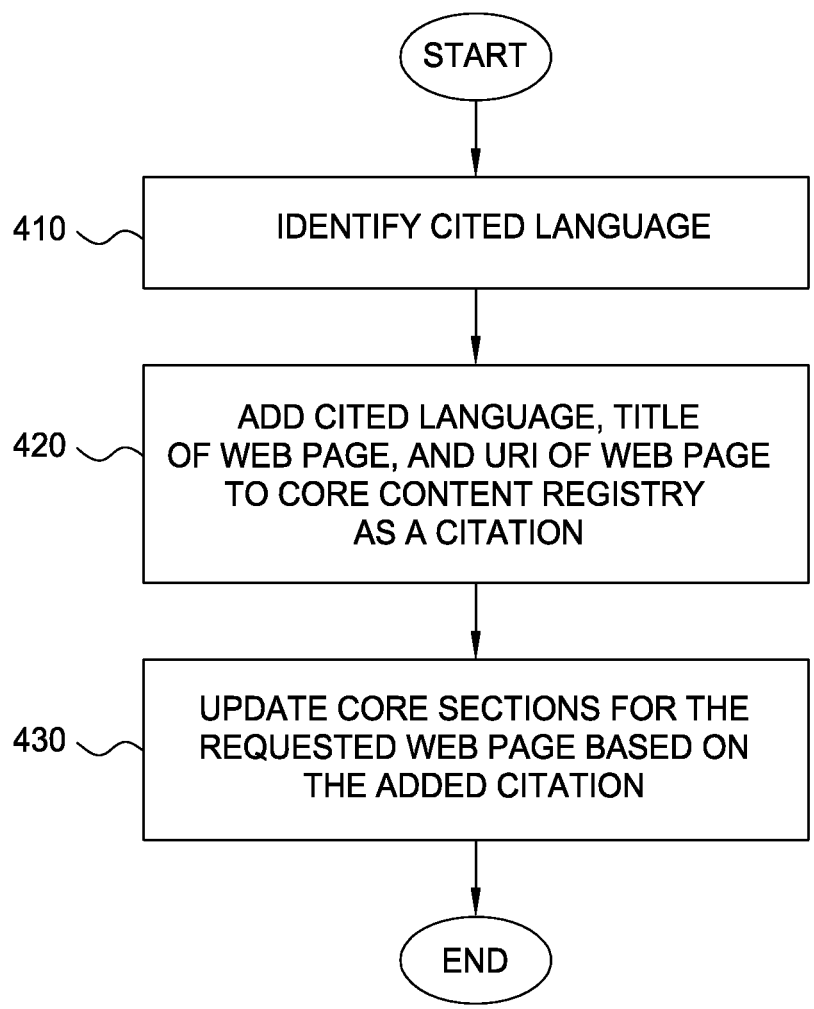
FIG. 4 is a flowchart depicting a method for updating a core content registry according to one embodiment of the invention.

FIG. 4 is a flowchart depicting a method 400 for updating a core content registry 164, according to one embodiment of the invention. The method 400 may be performed by the core content presenter 150 of FIG. 1. The steps of the method 400 correspond to step 320 of FIG. 3.

As shown, the method 400 begins at step 410, where the citation manager 210 identifies cited language in the web page 166. For example, the citation manager 210 may identify underlined language in the web page of Table II as language cited from the web page of Table I. In one embodiment, the core content presenter 150 may crawl a network 130 (e.g., in a manner similar to a web spider application) and iteratively update the core content registry 164 with web pages 166, citations 168, and core sections 170 as web pages are discovered by the core content presenter 150. In one embodiment, if the network 130 is the Internet, the core content presenter 150 may crawl the World Wide Web to identify cited language and update the core content registry 164. For example, cited language on the World Wide Web may include news article citations, weblog ("blog") citations, notebooks created using a research tool (e.g., the GOOGLE NOTEBOOK™ tool), technical paper footnotes, etc. In one embodiment, the core content presenter 150 may also update the core content registry 164 based on use of a service, such as a user posting to a weblog or editing a GOOGLE NOTEBOOK™.

The core content presenter 150 may identify cited language via a textual comparison of language from two web pages, according to one embodiment. For example, the core content presenter 150 may compare the language in the web page of Table II with the language in the web page of Table I to identify cited language. Other ways of identifying cited language (e.g., dictionary compression) are broadly contemplated by the invention.

At step 420, the citation manager 210 adds a citation 168 to the core content registry 164. The citation 168 may include cited language in the citing web page 166 and a title and URI of the citing web page 166. For example, the citation manager 210 may add the title, URI, and cited language in the web page of Table II to the core content registry 164 as a new citation 168. At step 430, the section manager 220 updates core sections 170 for the requested web page 152 based on the added citation 168. For example, the paragraph containing the cited language in the requested web page of Table I may be added as a core section 170.

In one embodiment, the section manager 220 adds a core section 170 to the core content registry 164 only if the criteria for core sections (e.g., as specified in the settings 160) are satisfied. For example, suppose that the settings example of Table VII specifies that a core section 170 should be cited by three or more web pages. In this case, if the requested web page 152 is only cited by two web pages, the section manager 220 does not add a core section 170 to the core content registry 164. After step 430, the method 400 terminates.

Figure 5:
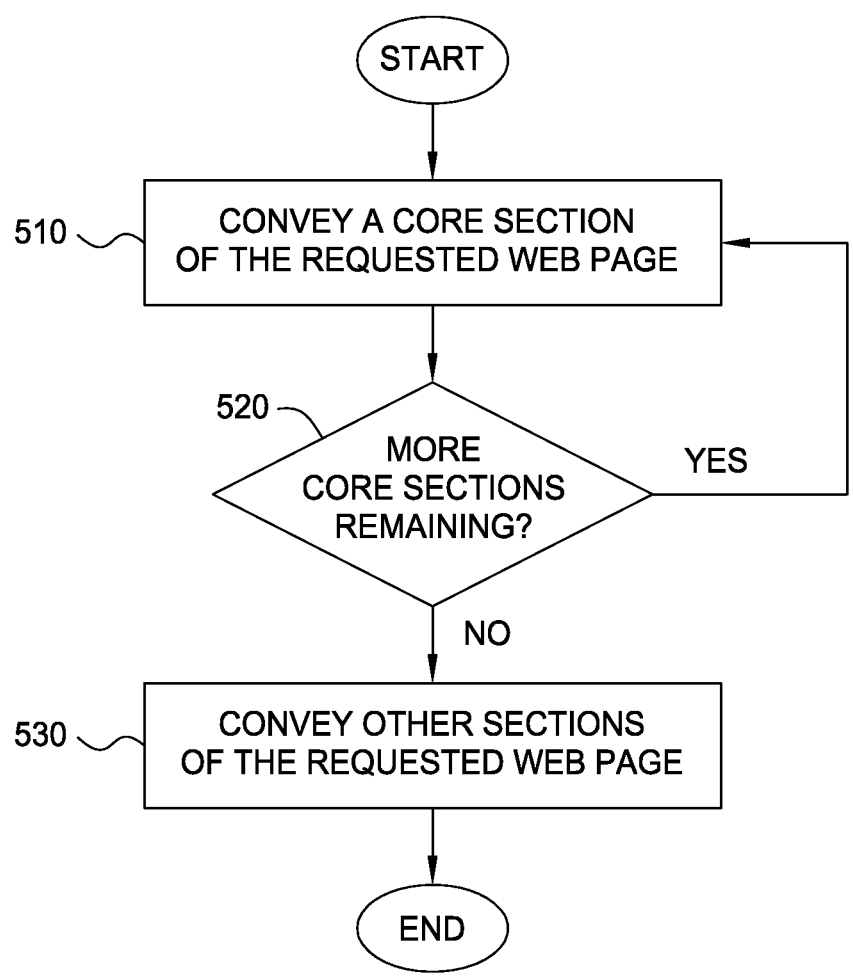
FIG. 5 is a flowchart depicting a method for conveying core sections of a web page, according to one embodiment of the invention.

FIG. 5 is a flowchart depicting a method 500 for conveying core sections of a web page, according to one embodiment of the invention. The method 500 may be performed by the core content presenter 150 of FIG. 1, according to one embodiment. The steps of method 500 correspond to step 350 of FIG. 3 and are described in conjunction with the core sections example of Table V.

As shown, the method 500 begins at step 510, where the presentation manager 250 conveys a core section 170 of the requested web page 152. For example, the presentation manager 250 may convey Section 3 of the core sections of Table V to a user (e.g., by reading Section 3 to a user). At step 520, the presentation manager 250 determines whether more core sections 170 remain (i.e., that have not yet been conveyed). If so, the method 500 returns to step 510, where the presentation manager 250 may convey another core section 170 to a user. For example, the presentation manager 250 may convey Section 5 of Table V to a user.

If all core sections 170 have been conveyed, the method 500 proceeds to step 530, where the presentation manager 250 conveys other sections 158 to the user. For example, the presentation manager 250 may convey Sections 1, 2, 4, and 6 of Table V to a user (e.g., by reading the sections to the user). Further, a user may specify in the settings 160 that the core sections 170 may be repeated when conveying the other sections 170. If a user so specifies, the presentation manager 250 may convey Sections 1 through 6 to a user (i.e., thereby repeating the core sections: Sections 3 and 5). After step 530, the method 500 terminates.

Of course, the embodiments described herein are intended to be illustrative and not limiting of the invention, and other embodiments are broadly contemplated. Those skilled in the art will recognize, for example, that embodiments of the invention may be adapted to support networks other than the Internet, markup languages other than HTML, etc.

Advantageously, embodiments of the invention convey a core section of a web page to a user. In one embodiment, a core content presenter may identify core sections based on citations by other web pages. The core content presenter may convey the core section to the user in a distinctive manner relative to other sections of the web page. If the web page includes a plurality of core sections, the core content presenter may cycle through the plurality of core sections based on user input. Further, the core content presenter may convey information about a citing web page. The core content presenter may also customize core sections by receiving user input to modify predefined criteria for identifying citations and core sections.

While the foregoing is directed to embodiments of the present invention, other and further embodiments of the invention may be devised without departing from the basic scope thereof, and the scope thereof is determined by the claims that follow.

What is claimed is:

1. A computer-implemented method to automatically identify and convey core sections of a specified document, based on citations to distinct portions of the specified document and uniquely identifying the specified document, the computer-implemented method comprising:
   receiving, from a requesting entity, a request to output the specified document;
   identifying a plurality of reference documents that each includes a respective citation to a distinct portion of the specified document, wherein each included citation uniquely identifies the specified document to the exclusion of other documents;
   determining a plurality of core sections of the specified document, based on the citations of the plurality of reference documents and by operation of one or more computer processors, each core section of which contains a respective one of the distinct portions in full, whereafter the specified document has at least one non-core section that does not contain any of the distinct portions even in part; and
   outputting the specified document to the requesting entity in a manner that emphasizes the plurality of core sections over the at least one non-core section of the specified document, responsive to the request.

2. The computer-implemented method of claim 1, wherein each of the plurality of citations satisfies a predefined criterion for identifying a citation.

3. The computer-implemented method of claim 1, wherein each core section satisfies a predefined criterion for identifying a core section, wherein the predefined criterion describes a unit of writing selected from at least one of a word, a clause, a sentence, a paragraph, a table cell, and a division.

4. The computer-implemented method of claim 1, further comprising:
   cycling through output the plurality of core sections based on user input.

5. The computer-implemented method of claim 1, wherein outputting the plurality of core sections in a manner that emphasizes the plurality of core sections comprises conveying the plurality of core sections before conveying the at least one non-core section of the specified document.

6. The computer-implemented method of claim 1 wherein outputting the plurality of core sections comprises displaying the plurality of core sections in a manner that visually distinguishes the core section from the at least one non-core section of the specified document.

7. The computer-implemented method of claim 1 wherein outputting the plurality of core sections comprises placing a view on one or more of the plurality of core sections, the view being selected from at least a screen magnifier and a full screen of a graphical display device.

8. The computer-implemented method of claim 1, wherein outputting the plurality of core sections includes modifying the plurality of core sections via a predefined set of custom Cascading Style Sheets (CSS) classes.

9. The computer-implemented method of claim 1, wherein at least a first one of the plurality of core sections includes a portion greater than a respective one of the distinct portions in full, wherein at least a second one of the plurality of core sections includes a portion no greater than a respective one of the distinct portions in full, where the plurality of reference documents are identified without requiring user intervention, wherein the plurality of core sections are determined without requiring user intervention;
wherein the requesting entity comprises a visually impaired, first user, wherein the plurality of core sections is emphasized over the at least one non-core section of the specified document in order to better convey the specified document in consideration of the visually impaired, first user, wherein the plurality of core section is emphasized based on an indication that the first user is visually impaired;
wherein responsive to a request from a second user not having any visual impairment, the specified document is output to the second user in a manner that does not emphasize any plurality of core sections over any of the at least one non-core section of the specified document, wherein the specified document is output to the second user in the manner based on an indication that the second user is not visually impaired.

10. The computer-implemented method of claim 9, wherein the plurality of core sections is determined and output based on predefined settings, wherein the predefined settings are configurable by the requesting entity and include:
(i) a minimum size in order for a portion to be established as a citation;
(ii) a maximum size not to be exceeded in order for a portion to be established as a citation;
(iii) a criterion specifying a total count of citations needed in order to establish a section as a core section;
(iv) a sequential order in which to output the plurality of core sections;
(v) a maximum count of core sections to output;
(vi) a maximum size not to be exceeded for a portion to be established as a section;
(vii) a minimum size for a portion to be established as a section;
(viii) a first keystroke to cycle through output of the plurality of core sections in sequential order; and
(ix) a second keystroke, different from the first keystroke, to cycle through output of the plurality of core sections in reverse sequential order.

11. The computer-implemented method of claim 10, wherein the plurality of core sections is determined and output by a core content presenter application, the core content presenter application having a plurality of components including a citation manager component, a section manager component, a navigation manager component, a settings manager component, and a presentation manager component;
wherein the citation manager component identifies the citations, wherein the section manager component determines the plurality of core sections, wherein the navigation manager component receives user input specifying to cycle through output of the plurality of core sections, wherein the settings manager component modifies the predefined settings based on user input, wherein the presentation manager component outputs the plurality of core sections.

12. The computer-implemented method of claim 11, wherein each core section is designated by markup language based on a plurality of custom stylesheet classes including a core-section class and a cited-language class, wherein each stylesheet class comprises a respective, Cascading Style Sheets (CSS) class;
wherein each core section satisfies a respective one of predefined criteria for identifying a clause, a sentence, a paragraph, a table cell, and a division, respectively, as a core section, wherein outputting the plurality of core sections in a manner that emphasizes the plurality of core sections comprises conveying the plurality of core sections before conveying the at least one non-core section of the specified document, wherein each of the specified document and reference documents comprises a respective web page.

13. The computer-implemented method of claim 12, wherein the plurality of core sections is output via an output device that is, in respective instances, an audio output device, a tactile detectable device, and a graphical display device;
wherein in the instance that the output device is the audio output device, the predefined settings further include: (x) a desired voice with which to output core sections; (xi) whether to automatically output non-core sections after outputting core sections; and (xii) whether to repeat core sections;
wherein in the instance that the output device is the graphical display device, the plurality of core sections is visually distinguished from the at least one non-core section of the specified document, including placing a view on one or more of the plurality of core sections, wherein the view is, in respective instances, a screen magnifier and a full screen of the graphical display device, wherein the predefined settings further include: (xiii) whether to output a copy of core sections, at a top of the specified document.

14. The computer-implemented method of claim 13, wherein the computer-implemented method further comprises:
cycling through output of the plurality of core sections, based on user input;
outputting information about a first one of the plurality of reference documents, based on user input;
subsequent to outputting information about the first reference document, receiving, from the requesting entity, a request for the first reference document; and
outputting the first reference document in a manner that emphasizes at least one core section of the first reference document over at least one non-core section of the first reference document.

15. A non-transitory computer-readable medium containing a program that, when executed, performs an operation to automatically identify and convey core sections of a specified document, based on citations to distinct portions of the specified document and uniquely identifying the specified document, the operation comprising:
receiving, from a requesting entity, a request to output the specified document;

identifying a plurality of reference documents that each includes a respective citation to a distinct portion of the specified document, wherein each included citation uniquely identifies the specified document to the exclusion of other documents;

determining a plurality of core sections of the specified document, based on the citations of the plurality of reference documents and by operation of one or more computer processors when executing the program, whereafter the specified document has at least one non-core section; and outputting the specified document to the requesting entity in a manner that emphasizes the plurality of core sections over the at least one non-core section of the specified document, responsive to the request.

16. The non-transitory computer-readable medium of claim 15, wherein each of the plurality of citations satisfies a predefined criterion for identifying a citation.

17. The non-transitory computer-readable medium of claim 15, wherein each core section satisfies a predefined criterion for identifying a core section, wherein the predefined criterion describes a unit of writing selected from at least one of a word, a clause, a sentence, a paragraph, a table cell, and a division.

18. The non-transitory computer-readable medium of claim 15, wherein the operation further comprises:

cycling through output of the plurality of core sections based on user input.

19. The non-transitory computer-readable medium of claim 15, wherein outputting the plurality of core sections includes modifying the plurality of core sections via a predefined set of custom Cascading Style Sheets (CSS) classes.

20. A system to automatically identify and convey core sections of a specified document, based on citations to distinct portions of the specified document and uniquely identifying the specified document, the system comprising:

a computer processor; and a memory containing a program that, when executed by the computer processor, is configured to perform an operation comprising:

receiving, from a requesting entity, a request to output the specified document;

identifying a plurality of reference documents that each includes a respective citation to a distinct portion of the specified document, wherein each included citation uniquely identifies the specified document to the exclusion of other documents;

determining a plurality of core sections of the specified document, based on the citations of the plurality of reference documents, whereafter the specified document has at least one non-core section; and outputting the specified document to the requesting entity in a manner that emphasizes the plurality of core sections over the at least one non-core section of the specified document, responsive to the request.

21. The system of claim 20, wherein each of the plurality of citations satisfies a predefined criterion for identifying a citation.

22. The system of claim 20, wherein each core section satisfies a predefined criterion for identifying a core section, wherein the predefined criterion describes a unit of writing selected from at least one of a word, a clause, a sentence, a paragraph, a table cell, and a division.

23. The system of claim 20, wherein the operation further comprises:

cycling through output of the plurality of core sections based on user input.

24. The system of claim 20, wherein outputting the plurality of core sections includes modifying the plurality of core sections via a predefined set of custom Cascading Style Sheets (CSS) classes.

* * * * *